United States Patent [19]

Callebaut et al.

[11] Patent Number: 5,215,771
[45] Date of Patent: Jun. 1, 1993

[54] PROCESS FOR CONTINUOUSLY CONCHING CHOCOLATE MASS

[75] Inventors: Frans Callebaut, Bambrugge; Rudy Bruyland, Herdersem/Aalst, both of Belgium

[73] Assignee: Callebaut N.V., Belgium

[21] Appl. No.: 723,026

[22] Filed: Jun. 28, 1991

[30] Foreign Application Priority Data

Jul. 4, 1990 [DE] Fed. Rep. of Germany ....... 4021305

[51] Int. Cl.⁵ .............................................. A23G 1/00
[52] U.S. Cl. .................................... 426/231; 426/519; 426/660
[58] Field of Search .................. 426/231, 660, 519

[56] References Cited

U.S. PATENT DOCUMENTS

| | | | |
|---|---|---|---|
| 4,139,309 | 2/1979 | Billingsley | 366/186 |
| 4,156,743 | 5/1979 | Schmitt | 426/660 |
| 4,518,262 | 5/1985 | Bornemann et al. | 366/186 |
| 4,611,921 | 9/1986 | Patel | 366/186 |
| 4,713,256 | 12/1987 | Chaveron et al. | 426/660 |
| 4,861,615 | 8/1989 | Wiedmann | 426/660 |

FOREIGN PATENT DOCUMENTS

| | | |
|---|---|---|
| 287209 | 11/1988 | European Pat. Off. |
| 514379 | 12/1930 | Fed. Rep. of Germany |
| 2151992 | 4/1973 | Fed. Rep. of Germany |
| 2341639 | 5/1974 | Fed. Rep. of Germany |
| 3202588 | 8/1983 | Fed. Rep. of Germany |
| 3629526 | 3/1988 | Fed. Rep. of Germany |
| 3637322 | 5/1988 | Fed. Rep. of Germany |
| 3918813 | 12/1989 | Fed. Rep. of Germany |
| 1567475 | 5/1969 | France |
| 2146140 | 4/1985 | United Kingdom |

OTHER PUBLICATIONS

Voedingsmiddelen Technologie, vol. 23, No. 5, Mar. 1990, Zeist NL P. R. Strikwerda: "PC-gestuurde weegsystemen in opmars".

Voedingsmiddelen Technologie, vol. 16, No. 7, Mar. 1983, Zeist NL, pp. 23-27; J. L. J. M. Pallandt, "Bedrijfszeker doseren tegenwordig belangrijket dan ooit".

Primary Examiner—George Yeung
Attorney, Agent, or Firm—Sughrue, Mion, Zinn, Macpeak & Seas

[57] ABSTRACT

In the continuous conching of chocolate mass in a conche (10) it is important to ensure essentially constant contents of the conche (10). For this purpose, the infeed of starting material and/or the discharge of the conched chocolate mass is monitored, namely measured, especially by means of weighing. In response to the measurement results, the infeed or the discharge is controlled, especially by means of altering the conveying capacity of a compulsory conveyor (screw conveyor 21) for discharging the conched mass. The conched chocolate mass is dry, i.e. it contains neither lecithin nor cocoa butter. Lecithin is added in the region of the screw conveyor (21) which is followed by a mixing device (22).

8 Claims, 6 Drawing Sheets

PROCESS FOR CONTINUOUSLY CONCHING CHOCOLATE MASS

BACKGROUND OF THE INVENTION

The invention relates to a process for continuously conching chocolate (starting) mass in a conche, into which starting material is continuously introduced and from which, correspondingly, conched chocolate mass is continuously discharged. Furthermore, the invention relates to an apparatus for conching the chocolate mass and for discharging same.

After being pretreated in the usual way, the (dry) starting material for the production of chocolate mass is intimately mixed in a mixing vessel (conche) for a longer period. Thereafter, the (conched) chocolate mass can be discharged to be further processed. A continuous conching of chocolate mass, i.e. a continuos operation of a conche with a continuous infeed of starting material and a likewise continuous extraction of conched chocolate mass is already known. DE-A-39 18 813 proposes to connect a plurality, namely three conches with one another for a continously running operation. The starting material is fed to a first conche, the partially conched material is fed to a second conche and finally to a third conche. From the latter, the ready-conched chocolate mass is discharged.

In this known proposal, screw conveyors are used as conveying means for the partially or completely conched chocolate mass. Each conche forms a lateral top overflow and each overflow is connected to a screw conveyor. The screw conveyors assigned to the first and second conche transport the chocolate mass to the (upper) inlet side of the following conche. The screw conveyor of the third or last conche serves for discharging the ready-conched chocolate mass.

Process and apparatuses for continuously conching chocolate mass have not yet prevailed in practice, the reason being problems occurring in maintaining an invariably constant quantity of chocolate mass in the conche. Moreover, the known solutions provide an unsatisfactory discharge of the conched chocolate mass.

SUMMARY OF THE INVENTION

The invention is therefore based on the object to further develop and improve the continuous conching of chocolate mass. The proposed measures shall particularly ensure an optimum mixing of the ingredients of the chocolate mass in the conche in a continuous mode of operation.

To attain this object, the process according to the invention is characterized in that the quantity of the fed in starting material and/or the quantity of the discharged conched chocolate mass is determined, especially by means of weighing, and that the infeed of starting material and/or the quantity of the discharged conched mass is or are controlled accordingly.

The basic idea of the invention is that the complex interrelations in the conching of chocolate mass can only be mastered, if the quantity of chocolate mass (constantly) present in the conche is measured as accurately as possible. This means that the infeed of the starting material as well as the discharged quantity of conched chocolate mass have to be accurately dosed to avoid any variations regarding the contents of the conche.

In the process and the apparatus as taught by the invention, the conched chocolate mass is extracted from the conche by means of a compulsory conveyance, especially by means of a screw conveyor. The drive or the conveying capacity of the screw conveyor is controlled such that with a predefined infeed of starting material, the quantity of chocolate mass in the conche remains nearly constant.

Expediently, the fed in starting material as well as the extracted conched chocolate mass are measured continuously or intermittently and the discharge of the conched chocolate mass and/or the quantity of the fed in starting material are regulated accordingly.

According to the invention, the quantity of the chocolate mass discharged from the conche can be determined by weighing and in response, the conveyor drive of the screw conveyor can be temporarily or intermittenly interrupted. The desired quantity of chocolate mass to be discharged can be based on a specific unit of time. In response to the measured discharge quantity, the conveyor drive of the screw conveyor can be shut off several times, if required, during this unit of time, so that the exact desired quantity is discharged during a unit of time. The quantity of fed in starting material can in this process be kept constant by means of a respective dosing, or it may also be continuously or intermittently measured.

The invention is further concerned with an optimum mixing of the chocolate mass. According to a further feature, a mixing device is arranged outside the conche, especially downstream of the screw conveyor. According to the invention, this mixing device is connected to the screw conveyor, so that from the conche and via the screw conveyor, the chocolate mass directly reaches a mixing device located in an elongate cylindrical housing. In this mixing device, the chocolate mass is mixed until it is pumpable.

Further features of the invention relate to the structure of the conche, especially for reliably discharging the conched chocolate mass, and to the structure of the screw conveyor and the mixing device.

BRIEF DESCRIPTION OF THE DRAWINGS

Illustrative embodiments of the invention will be explained below in more detail with reference to the drawings, in which.

DESCRIPTION OF PREFERRED EMBODIMENTS

Figure 1:
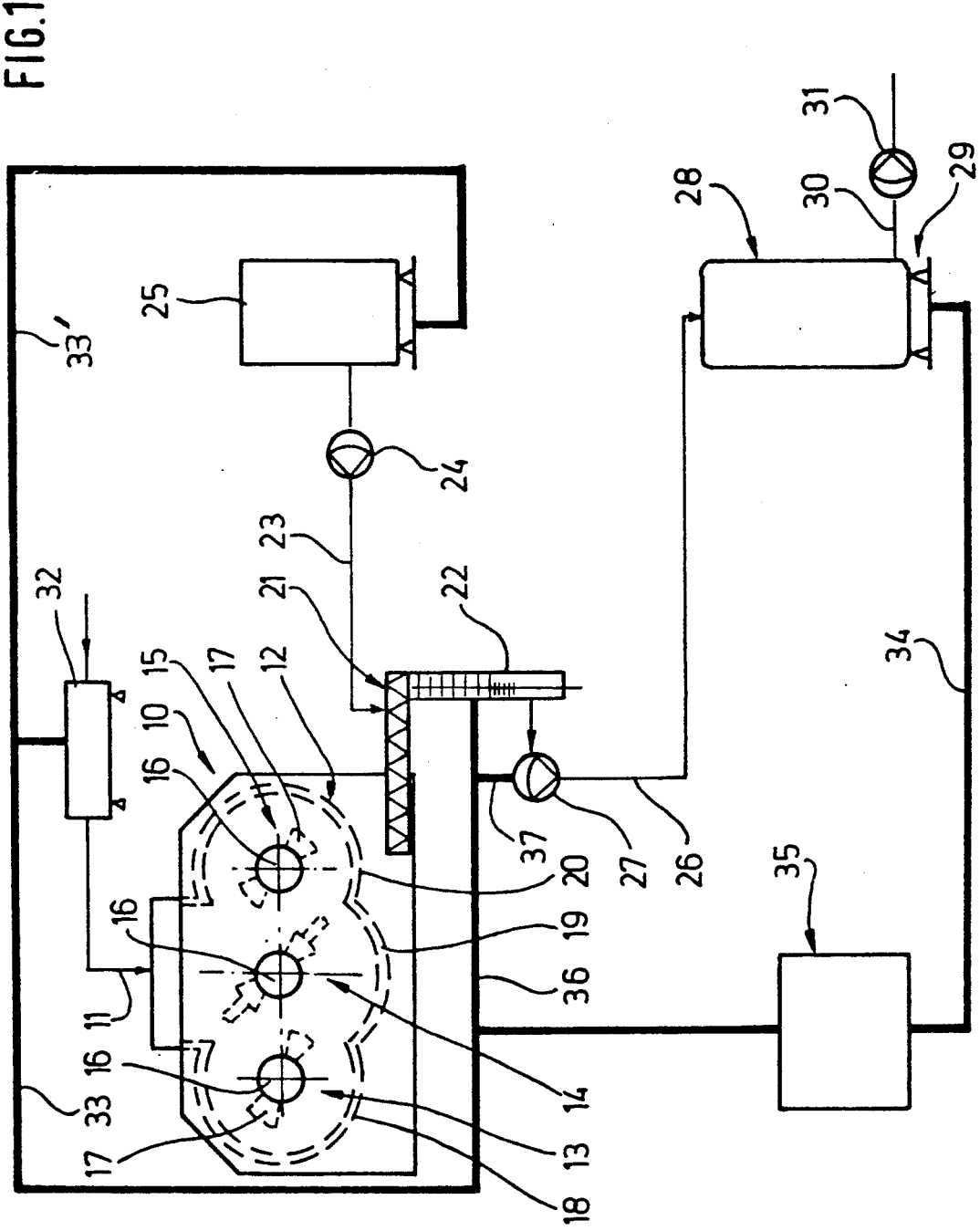
FIG. 1 is a schematic plan of a plant for continuously conching chocolate mass.
Figure 2:
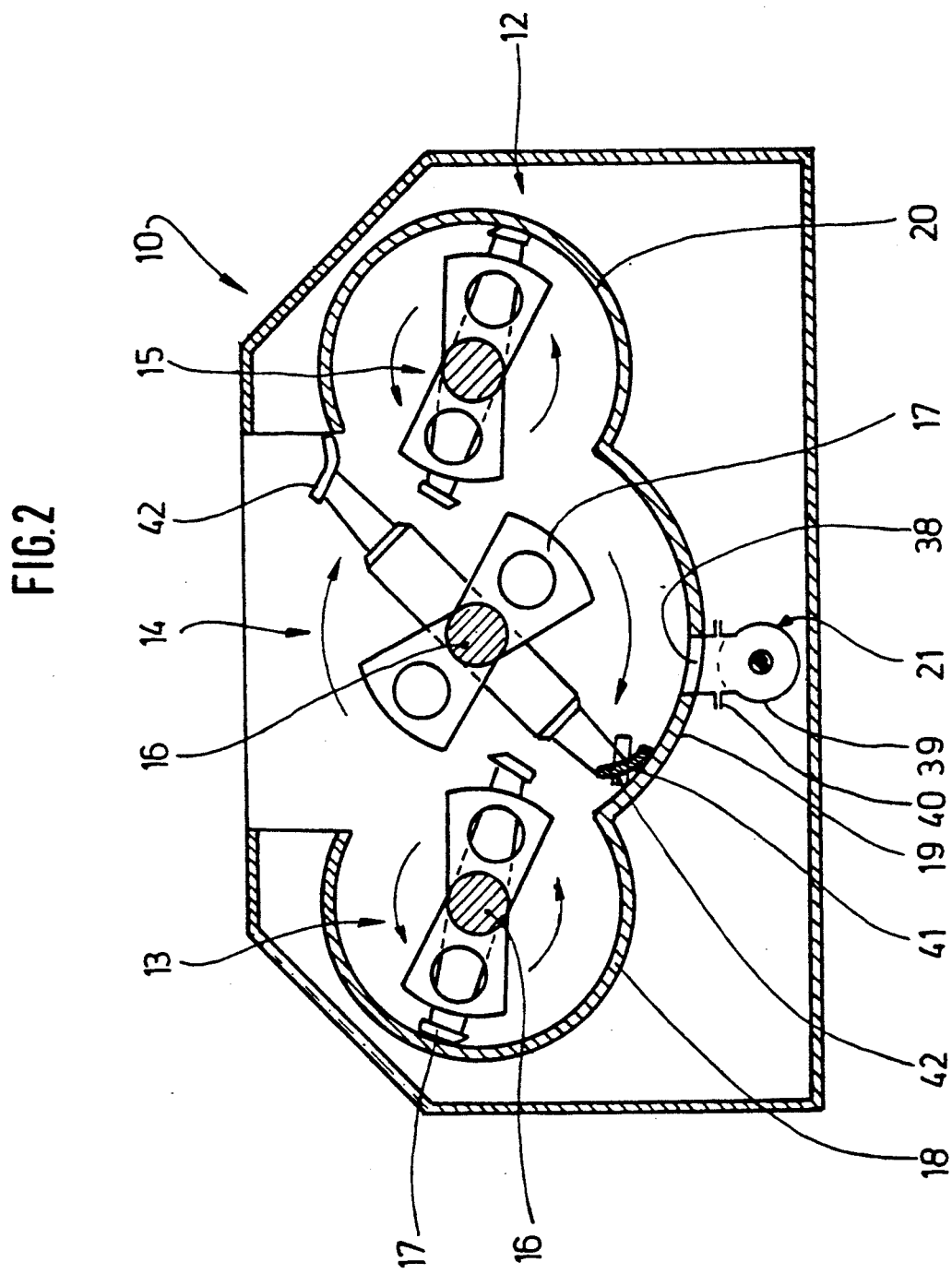
FIG. 2 shows a cross-section of a conche.

In the shown embodiment, starting material is mixed, i.e. conched, in a single conche 10 having an essentially customary structure. After being pretreated in the usual way, the (dry) starting material is fed to the conche 10 via a feed conveyor 11 (e.g. a belt conveyor). The starting material is introduced at the top of the conche 10, which has a predominantly open top, specifically in the region of an end face.

The conche 10 comprises a conche vessel 12, inside which a mixer is arranged for intensely conching the (dry) chocolate mass. In the present embodiment, three rotating rotors 13, 14 and 15 are arranged in the conche vessel 12. These rotors are rotatably mounted in the conche vessel 12 with axis-parallel rotor shafts 16. Appropriate wings 17, which are known per se, are arranged on the rotor shaft 16. Within the conche vessel 12, an operating area is assigned to each rotor 13, 14, 15. Accordingly, the conche vessel 12 is divided into three partly cylindrical vessel portions 18, 19, 20 which are each assigned to one rotor 13, 14, 15.

The conched chocolate mass is continuously extracted from the conche 10 in a bottom region, specifically by means of a compulsory conveyor, namely by a screw conveyor 21 which, in the present embodiment, transports the conched chocolate mass into a screw-like mixing device 22 for a (further) intimate mixing of the chocolate mass. In the region of the screw conveyor 21, lecithin is introduced to the conched chocolate mass from a lecithin vessel 25 via a lecithin line 23 with a pump 24. The mixing device 22 intimately mixes the chocolate mass. Cocoa butter may also be added in the region of the screw conveyor 21.

The (lecithin-containing) chocolate mass is discharged from the mixing device 22 via a conveying line 26 with a pump 27, specifically into a measuring vessel, which, in the present case, is a balance vessel 28 of a balance 29 for determining the quantity of discharged chocolate mass. From the balance vessel 28, the chocolate mass is discharged to be further processed via a line 30 with a pump 31.

An outstanding feature of the present system is that the quantities of the treated materials are continuously or intermittently measured and the operation of the plant is controlled accordingly. Setting out from an uninterrupted operation of the conche 10, specifically with constant rotating velocities of the rotors 13, 14, 15, the object is to create consistently invariable conditions within the conche 10. For this purpose, the quantity of chocolate mass which is present within the conche 10 or in the conche vessel 12 shall remain constant.

In the present embodiment, a measuring unit for determining the quantity of the fed in starting material is arranged in the region of the feed conveyor 11. In the present case, this measuring unit is a conveyor type weigher 32 which continuously weighs the quantity of starting material transported to the conche vessel 12.

Moreover, the quantity of the discharged conched chocolate mass is determined, specifically also by means of weighing, namely with the balance 29 and the balance vessel 28. Conveyor type weigher 32 and balance 29 are connected to an (electronic) control unit 35 of appropriate design via control lines 33 and 34. In response to the measured quantity or weight and via control lines 36 and 37, this control unit 35 controls the screw conveyor 21 or the mixing device 22, such that their conveying capacity is altered or temporarily interrupted. Accordingly, the conveying capacity of the pump 27 is also reduced or shut off. A further control line 33 leads to the lecithin vessel 25 or to a dosing means (balance) thereof, so that in response to the quantity conveyed by the screw conveyor 21, the addition of lecition can be altered or interrupted accordingly.

With the present system, the operation of the conche 10, namely infeed and discharge of the materials, can be controlled expediently in such a way that a constant quantity of starting material is continuously fed via the feed conveyor 11 into the conche 10. The quantity of conched chocolate mass which is extracted by the screw conveyor 21 is determined continuously or in intervals by the balance 29. In response, the discharge of the chocolate mass is controlled such that the discharged quantity corresponds to the quantity of the fed in starting material. Expediently, the conveying drive of the screw conveyor 21 and the mixing device 22 is temporarily interrupted. This means that the screw conveyor 21 is designed for a capacity which is greater than a capacity which would correspond to the fed in quantity of starting material.

In one example, the conche 10 is charged with starting material at a rate of 1500 kg/h. The quantity of conched chocolate mass which is to be discharged corresponds thereto. Consequently, 1500 kg are to be discharged by the screw conveyor 21 in one hour of operation, and for instance 500 kg are to be discharged in a period of 20 min. The capacity of the screw conveyor 21 is designed such that this conveying quantity is reached in a shorter period and then the screw conveyor is shut off for a period of for instance 5 min. Accordingly, in each of the following time cycles of 20 min (of a unit of time of one hour), the compulsory conveyor is shut off for a period of up to 5 min, depending on the period required for conveying the quantity (500 kg) which is to be discharged in each time cycle.

The discharged quantity of chocolate mass may also be adapted to the infeed of starting material in a different way, for example by reducing the conveying capacity of the continuously driven screw conveyor 21, i.e. by reducing the rate of revolutions.

Figure 3:
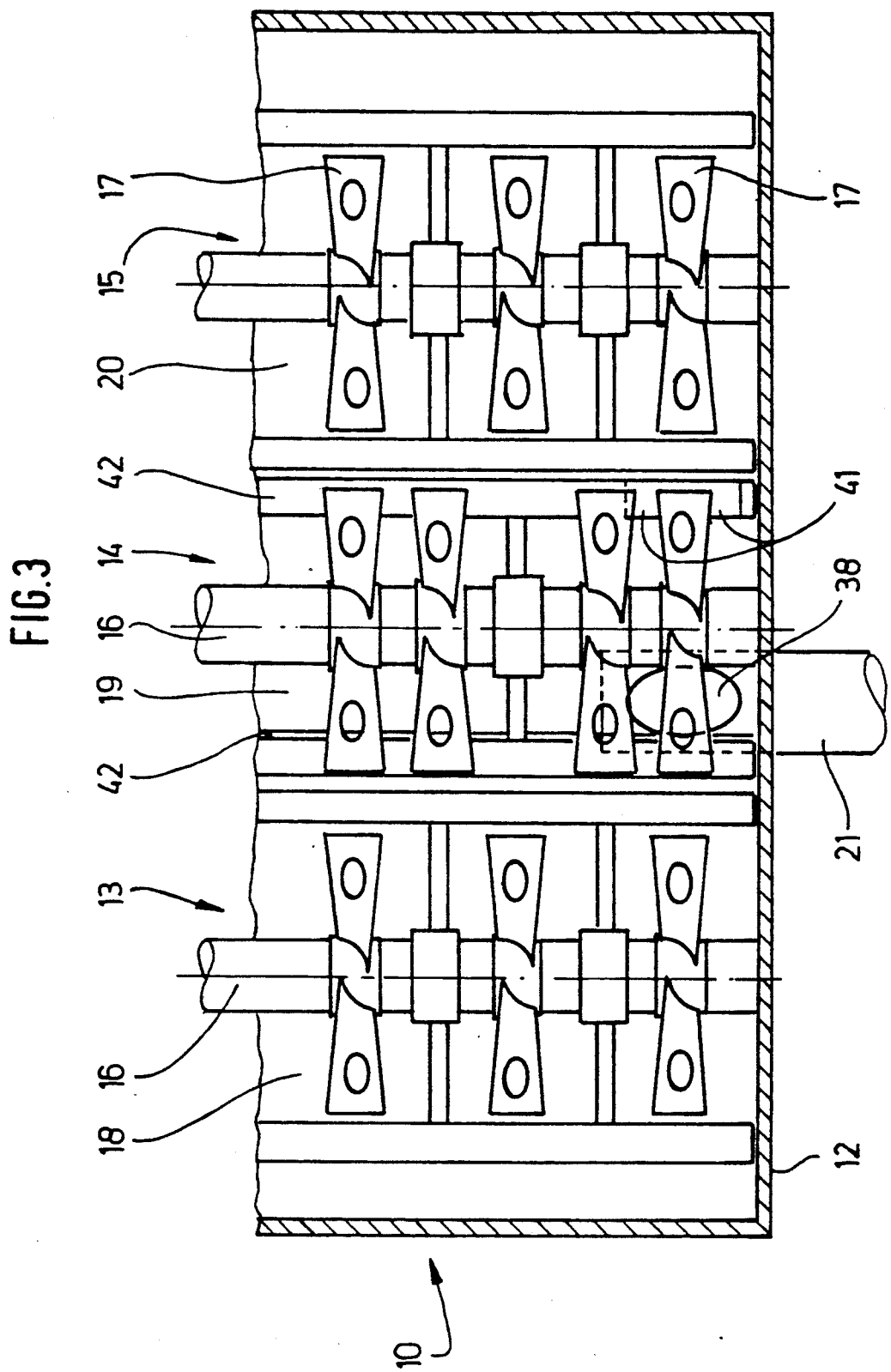
FIG. 3 is a plan view of an edge portion of the conche according to FIG. 2.
Figure 4:
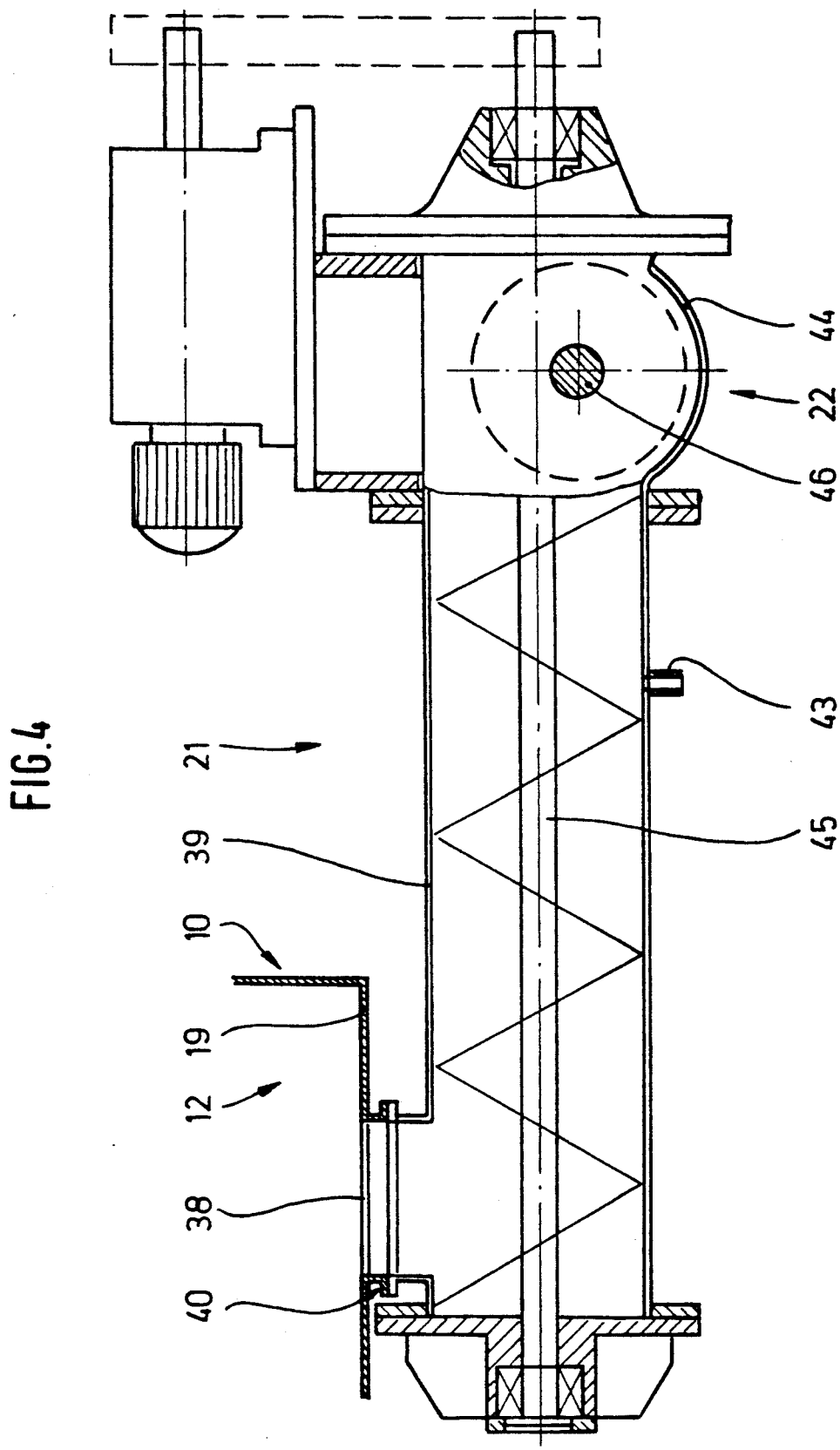
FIG. 4 is a longitudinal section of a compulsory conveyor, namely a screw conveyor in connection with a conche.
Figure 5:
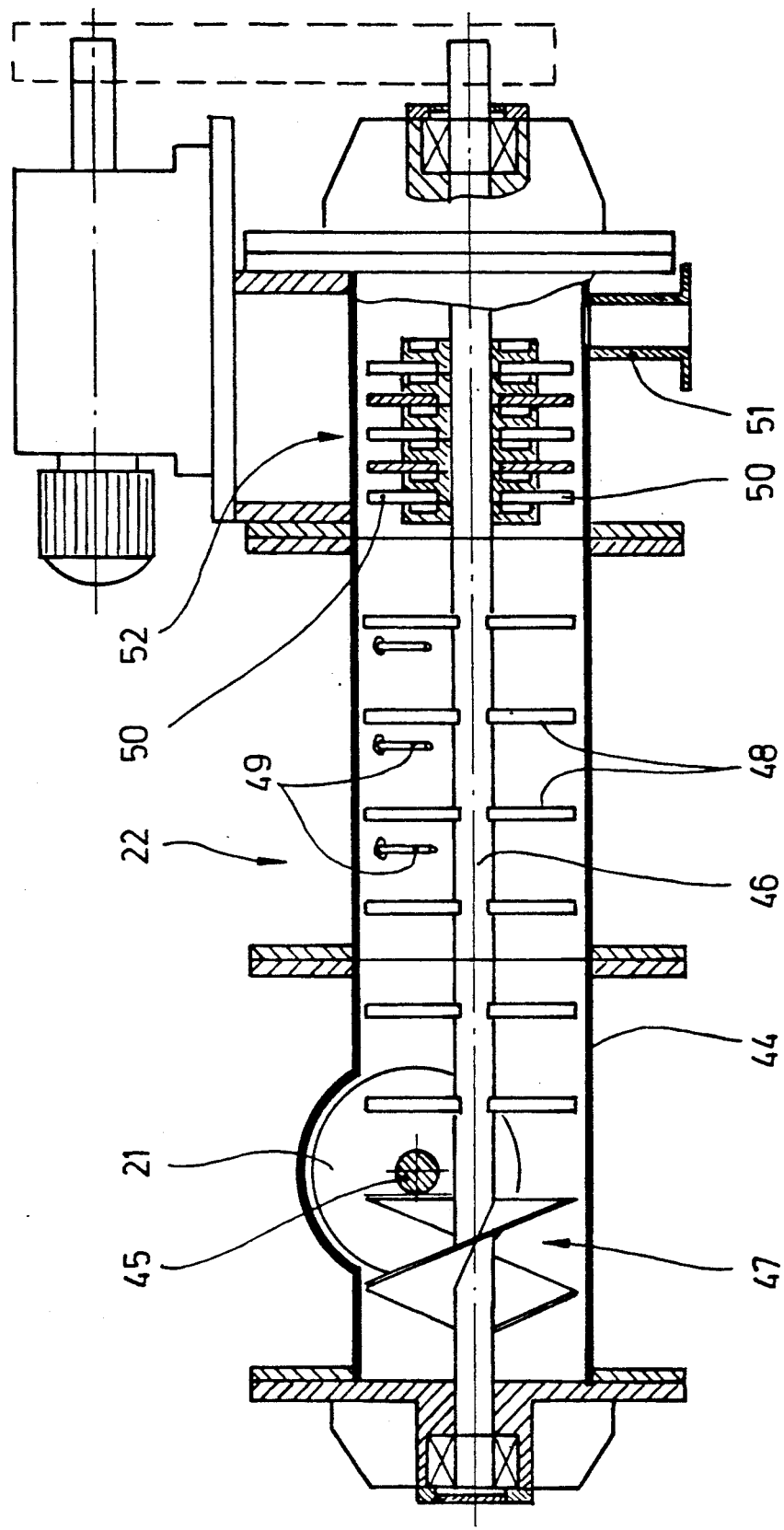
FIG. 5 is a longitudinal section of a mixing device following the screw conveyor.
Figure 6:
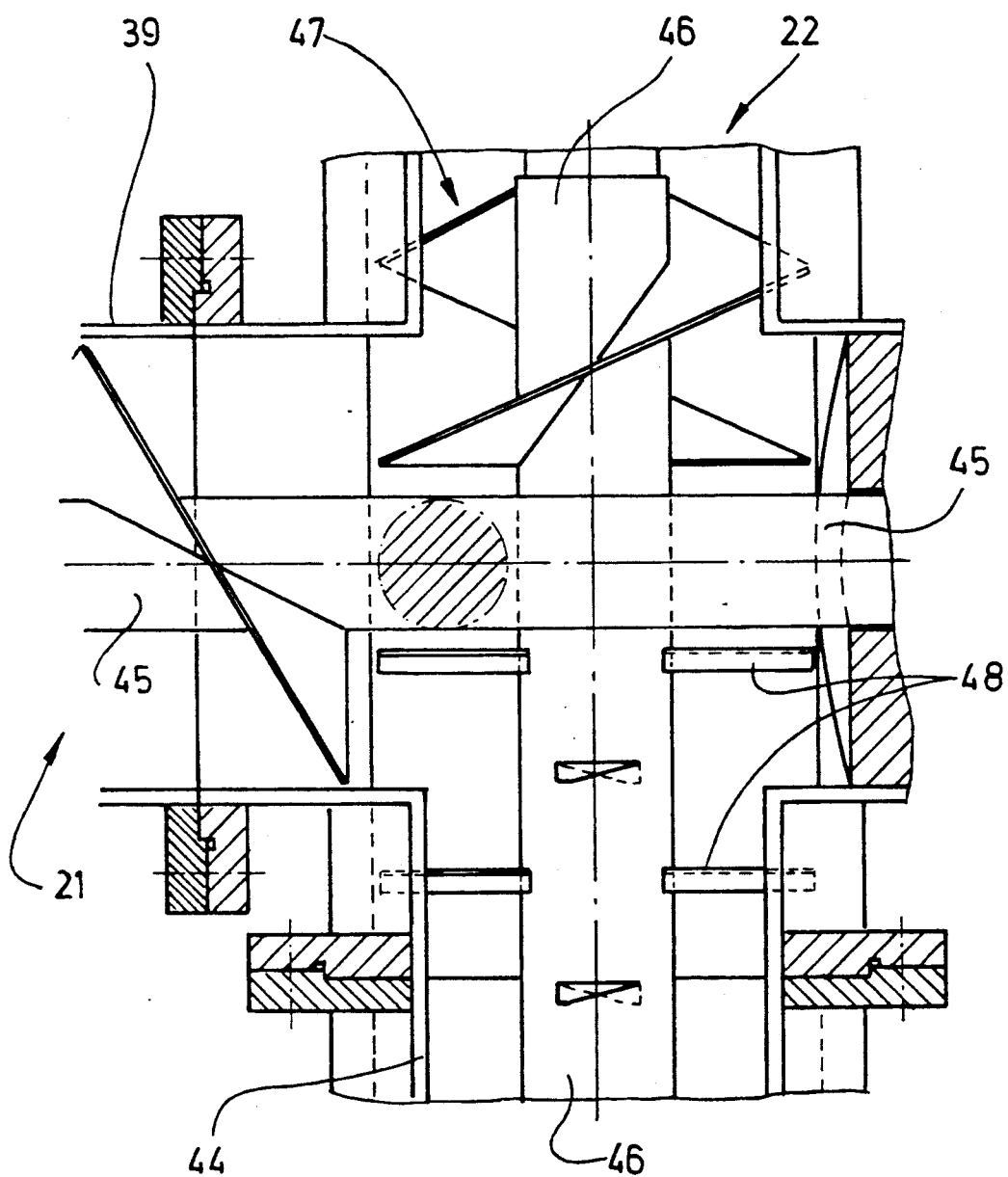
FIG. 6 is a plan view or horizontal section of a detail showing a portion where screw conveyor and mixing device intersect.

An important subject is the effective constant extraction of the chocolate mass from the conche 10 by means of the screw conveyor 21. The conche 10 or its conche vessel 12 is provided with an outlet opening 38 in the region of the vessel center portion 19, which has the greatest diameter. The opening is elongate, especially oval (FIG. 3) and extends with its longer axis in a direction axis-parallel to the (partly cylindrical) vessel portion 19. Moreover, the outlet opening 38 is located slightly off center, i.e. offset to the centrally mounted rotor shaft 16 of the rotor 14. Furthermore, the outlet opening 38 is arranged such that it is located diametrically opposite the side where the starting material is fed in.

The screw conveyor 21 or a screw housing 39 thereof is connected to the outlet opening 38, such that the screw conveyor 21 extends in a direction axis-parallel to the rotors 13, 14, 15. Vessel portion 19 and screw housing 39 are linked to one another via a flange connection 40 with extremely short pipe connections.

Special measures ensure that the conched material reliably reaches the outlet opening 38 and therewith the screw conveyor 21. For this purpose, a specifically designed conveying means is rotating in the vessel (center) portion 19. This conveying means consists of a conveying web 41 which runs along the inside of the wall of the vessel portion 19. The path of motion of the conveying web 41 is defined such that it runs over the outlet opening 38 with every rotation. The design of the conveying web 41 ensures that in this process chocolate mass is fed into the outlet opening 38.

In the present embodiment, the conveying web 41 is designed as a flat bar directed inclined relative to the wall of the conche vessel 12. The edge of this flat bar which is confronting the wall of the conche vessel 12 is preferably sharpened and is pointing rearwards with respect to the direction of movement. This results in a wedge-shaped relative position of the conveying web 41 which ensures the conveying effect: The chocolate mass is pressed into the outlet opening 38.

In the present embodiment, the conveying web 41 forms a part, namely a section, of scrapers 42 which are rotating with the rotors 13, 14, 15 and which are sliding along the wall surface of the conche vessel with a sharpened edge. Here, the conveying web 41 is designed with the same profile as the scrapers, but with an oppositely directed relative position, so that instead of a scraping effect, the described conyeying effect is created.

The conched chocolate mass is fed to the mixing device 22 by the screw conveyor 21. In the region of the screw conveyor, lecithin is added via the lecithine line 23 which is preferably connected to the bottom side of the screw conveyor 21 via a line connection 43. Cocoa butter can also be added in this region.

The mixing device 22 following the screw conveyor 21 is directed transverse to the screw conveyor 21. The screw housing 39 merges into a mixer housing 44 in an intersecting region. In this embodiment, this mixer housing is also designed cylindrically.

Screw conveyor 21 and mixing device 22, that is to say their shafts, namely screw shaft 45 and mixer shaft 46, are arranged offset to one another. The mixer shaft 46 extends directly below the screw shaft 45. As a result, said shafts can be led past one another and can be mounted outside screw housing 39 and mixer housing 44.

The mixing device 22 is designed screw-like, i.e. with a conveying effect in the axial direction. In the entrance region. i.e. adjacent to the screw conveyor 21, there is arranged a screw portion 47 which conveys the chocolate mass entering the mixer housing 44 transverse to the infeed direction within the mixer housing 44. The screw portion 47 is arranged offset to the exit end of the screw conveyor 21. A first mixing portion of the mixing device comprises radially directed mixing tools, namely rods 48. These are distributed in the peripheral direction and in the longitudinal direction. The rods 48 interact with counter tools, namely counter rods 49 which are arranged on the inner side of the mixer housing 44.

This first mixing portion is followed by a portion of very intense mixing, namely by a homogenizer 52 with interacting mixing blades 50. The mixing device 22 or the mixer shaft 46 is driven at a high velocity, e.g. at 2200 revs/min. The sequence of conveyance is defined such that the chocolate mass (containing lecithin) remains in the mixing device 22 for a period of about 1 min.

In a following portion which is free of any mixing means, the chocolate mass is discharged, specifically through an outlet connection 51 located on the bottom side of the mixer housing 44. The already described conveying line 26 is connected to this outlet connection 51.

We claim:

1. A process for continuously conching chocolate mass in a conche, into which starting material is continuously fed and from which, correspondingly, conched chocolate mass is continuously discharged, said process comprising the steps of: determining the quantity of starting material fed into said conche or the quantity of the discharged conched chocolate mass.

2. The process as claimed in claim 1, wherein only the quantity of the discharged chocolate mass is determined, and the infeed of starting material is controlled accordingly.

3. The process as claimed in claim 1, wherein a constant quantity of starting material is fed in, the correspondingly discharged quantity of conched chocolate mass is measured, and the discharge capacity is controlled accordingly.

4. The process as claimed in claim 1, wherein the conched chocolate mass is discharged by means of a continuously conveying screw conveyor (21) whose drive is controlled in response to the determined quantity of discharged conched chocolate mass.

5. The process as claimed in claim 4, wherein the conveying capacity of the screw conveyor (21) is greater than the quantity of the starting material which is fed in continuously or for a unit of time, and wherein the drive of the screw conveyor (21) is controlled in such a way that the overall conveying capacity during a unit of time corresponds to the quantity of starting material fed into said conche.

6. The process as claimed in claim 1, wherein, in the case of an infeed of a predefined quantity of starting material per unit of time, the material discharge during this unit of time is measured in each case within a plurality of fractions of said unit of time, and wherein, in response to the measurement, the discharge is in each case interrupted, such that the overall discharge per unit of time corresponds to the quantity of starting material fed into said conche.

7. The process as claimed in claim 4, wherein the conched chocolate mass discharged from the conche (10) is conveyed into a measuring vessel (28) for determining the discharged quantity, said measuring vessel or a balance (29) thereof being connected to the screw conveyor (21) via control lines (34, 36).

8. The process as claimed in claim 4, wherein lecithin and cocoa butter are added to the conched chocolate mass after said mass has left the conche (10).

* * * * *